J. J. Grant,
Screw Threading Machine.
No. 96,910.   Patented Nov. 16, 1869.
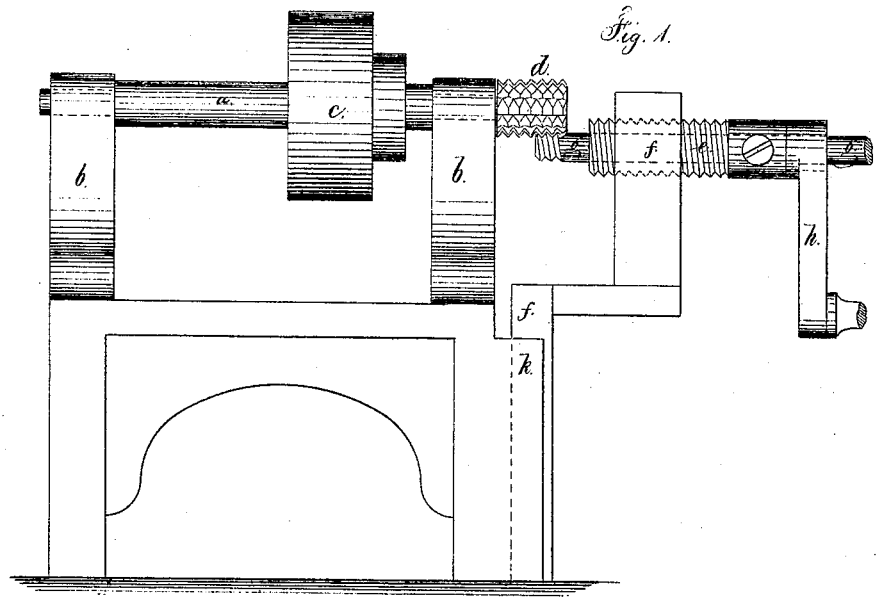
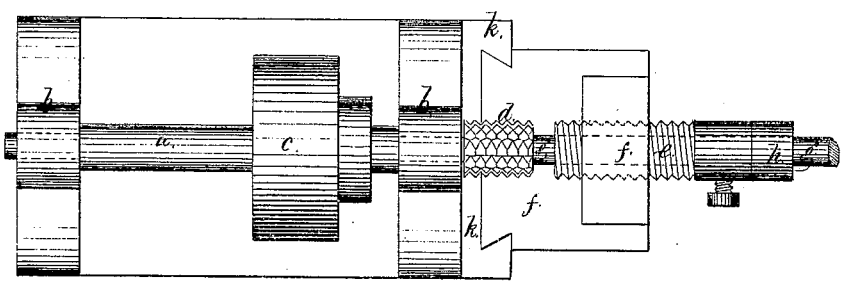

United States Patent Office.

JOHN JAMES GRANT, OF NORTHAMPTON, MASSACHUSETTS, ASSIGNOR TO CHARLES H. STOCKBRIDGE,* OF SAME PLACE.

Letters Patent No. 96,910, dated November 16, 1869; antedated November 6, 1869.

IMPROVEMENT IN MACHINES FOR CUTTING THREADS ON BOLTS.

The Schedule referred to in these Letters Patent and making part of the same.

*To all whom it may concern:*

Be it known that I, JOHN JAMES GRANT, of Northampton, in the county of Hampshire, and State of Massachusetts, have invented and made a new and useful Improvement in Machinery for Cutting Screws and Sections of Screws; and I hereby declare the following to be a full, clear, and exact description of the said invention, reference being had to the annexed drawing, making part of this specification, wherein—

Figure 1 is a side view, illustrating the features of my invention, and

Figure 2 is a plan of the same.

Similar marks of reference denote the same parts.

In cutting screws, it has heretofore been usual to employ a tool that acts like a chisel, and is either revolved around the screw to be formed, or else the screw itself is revolved, and the tool held against it.

In these means for cutting screws, a defect frequently arises from the tool becoming blunt, or the edge breaking, and there is but little opportunity for the shavings or cuttings to pass away, and if they become clogged the cutting-edge is often prevented from operating.

This invention belongs to that class of screw-making machines which has a rotary cutter, formed with teeth or cutters of the shape of the groove forming the screw-thread, in combination with a stock that holds the article to be cut, and is provided with a screw-thread, so that as the stock and article to be cut are revolved in contact with the rotary cutter or burr, an end movement is given that causes a screw-thread to be cut around or upon the screw-blank or section presented to the same.

By this means, the screw is formed by a number of revolving points that come in contact with said screw and then leave it, so that the centrifugal force may throw off the cuttings or shavings of metal or other material, and, in case of any one point being broken, the screw is not injured, there being several other points acting in the same thread.

In the drawing—

*a* is a mandrel, mounted in the head-block *b*, and fitted with the pulley *c*, so as to be revolved very rapidly.

At the end of the mandrel *a* is a cutter, *d*. This cutter is formed with a cylindrical or partially-tapering outline, and, in its periphery, grooves are turned, of the sectional shape required for the screw-thread to be formed, and said cylinder is also divided by longitudinal or spiral grooves, so as to form ranges or rings of cutting-teeth, and this cylinder of teeth might be made of separate disks or rings set together, each having cutting-teeth on the periphery.

The article to be cut is held in a stock that is capable of being revolved, and a screw is connected therewith, so that the act of revolving gives an end movement to the stock.

This stock is to be constructed so that it can receive and clamp any article that is to receive the screw-thread, and the modes in which said stock is to be made will readily suggest themselves to the machinist.

I have represented the hollow screw *e* mounted in the rest *f*, and receiving through it the rod *g*, upon which the screw is to be cut, the rod *g* being clamped in *e*, so that the two will turn together as the handle *h* is rotated.

I have represented the rest *f* as set in slides *k*, so that a motion can be given to the same by a lever or screw at right angles to the axis of the screw to be cut, in order that said screw may be cut by forcing the blank up sidewise against the cutter *d*, and giving it one rotation or more.

The blank to be cut may be supported and kept from vibrating under the action of the rotary cutter by lying in a groove, or between rollers that support and steady the same, and where a section of a screw is being made, the same can be held in a stock, and partially or entirely revolved under the action of the revolving cutter.

I do not claim cutting a screw by a revolving wheel, having a grooved face and teeth, as the same has been employed in connection with cams for giving end motion to the screw, while being separately revolved.

What I claim, and desire to secure by Letters Patent, is—

The tool *d*, constructed as described, in combination with the holder *e* having a male-screw on its periphery, and the rest *f* with a corresponding female-screw, all arranged and operated together, substantially in the manner described.

In witness whereof, I have hereunto set my signature, this 10th day of February, A. D. 1869.

JOHN J. GRANT.

Witnesses:
A. PERRY PECK,
A. F. STRONG.

*Assignor of one half of his right to Osmond O. Roberts.